(12) United States Patent
Ringseth et al.

(10) Patent No.: US 9,417,914 B2
(45) Date of Patent: Aug. 16, 2016

(54) REGAINING CONTROL OF A PROCESSING RESOURCE THAT EXECUTES AN EXTERNAL EXECUTION CONTEXT

(75) Inventors: Paul Ringseth, Bellevue, WA (US); Genevieve Fernandes, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1262 days.

(21) Appl. No.: 12/131,127

(22) Filed: Jun. 2, 2008

(65) Prior Publication Data

US 2009/0300636 A1 Dec. 3, 2009

(51) Int. Cl.
*G06F 9/46* (2006.01)
*G06F 9/50* (2006.01)

(52) U.S. Cl.
CPC ............... *G06F 9/50* (2013.01); *G06F 9/5005* (2013.01); *G06F 9/5011* (2013.01); *G06F 9/5016* (2013.01); *G06F 9/5022* (2013.01); *G06F 9/5027* (2013.01)

(58) Field of Classification Search
USPC .......................................... 718/100, 102, 104
See application file for complete search history.

(56) References Cited

U.S. PATENT DOCUMENTS

| | | | |
|---|---|---|---|
| 5,692,193 A | 11/1997 | Jagannathan et al. | |
| 5,918,049 A * | 6/1999 | Syvaniemi | 718/104 |
| 6,574,718 B2 * | 6/2003 | Sutherland et al. | 711/159 |
| 6,725,188 B1 * | 4/2004 | Shingai et al. | 703/22 |
| 7,181,741 B2 | 2/2007 | Sangili | |
| 7,191,440 B2 | 3/2007 | Cota-Robles et al. | |
| 7,234,139 B1 | 6/2007 | Feinberg | |
| 7,444,635 B2 * | 10/2008 | Lehtinen | 718/104 |
| 2002/0016809 A1 * | 2/2002 | Foulger et al. | 709/102 |
| 2002/0078123 A1 * | 6/2002 | Latour | 709/104 |
| 2002/0133530 A1 * | 9/2002 | Koning | 709/102 |
| 2003/0046464 A1 | 3/2003 | Murty et al. | |
| 2004/0019891 A1 * | 1/2004 | Koenen | 718/102 |
| 2004/0025160 A1 * | 2/2004 | Dice et al. | 718/102 |
| 2004/0103414 A1 * | 5/2004 | VomLehn et al. | 718/102 |
| 2005/0210472 A1 * | 9/2005 | Accapadi et al. | 718/105 |
| 2006/0017969 A1 | 1/2006 | Ly et al. | |

(Continued)

FOREIGN PATENT DOCUMENTS

| | | |
|---|---|---|
| CN | 1842769 | 10/2006 |
| RU | 2280272 | 7/2006 |
| RU | 2286595 | 10/2006 |

OTHER PUBLICATIONS

"VMware Virtual SMP", Product Datasheet, VMware, Inc., Copyright 1998, 1 Page.

(Continued)

*Primary Examiner* — Charles Swift
(74) *Attorney, Agent, or Firm* — Kevin Sullivan; Aaron Hoff; Micky Minhas (57) ABSTRACT

A scheduler in a process of a computer system allows an external execution context to execute on a processing resource allocated to the scheduler. The scheduler provides control of the processing resource to the external execution context. The scheduler registers for a notification of an exit event associated with the external execution context. In response to receiving the notification that the exit event has occurred, the scheduler regains control of the processing resource and causes a task associated with an execution context controlled by the scheduler to be executed by the processing resource.

20 Claims, 7 Drawing Sheets

(56) References Cited

U.S. PATENT DOCUMENTS

| | | | |
|---|---|---|---|
| 2006/0085793 A1* | 4/2006 | McKenney | 718/100 |
| 2006/0112377 A1 | 5/2006 | Nacul et al. | |
| 2006/0130062 A1 | 6/2006 | Burdick et al. | |
| 2006/0225078 A1* | 10/2006 | Anderson | 718/104 |
| 2007/0006228 A1 | 1/2007 | Grobman et al. | |
| 2007/0011661 A1* | 1/2007 | Itoh | 717/127 |
| 2007/0101326 A1* | 5/2007 | Cai et al. | 718/100 |
| 2007/0113227 A1 | 5/2007 | Oney et al. | |
| 2007/0169127 A1 | 7/2007 | Kashyap | |
| 2007/0204268 A1* | 8/2007 | Drepper | 718/102 |
| 2007/0256078 A1* | 11/2007 | Falk et al. | 718/104 |
| 2007/0266387 A1* | 11/2007 | Henmi | 718/102 |
| 2008/0077926 A1* | 3/2008 | Jeter et al. | 718/102 |
| 2008/0077928 A1 | 3/2008 | Matsuzaki et al. | |
| 2008/0313639 A1* | 12/2008 | Kumar et al. | 718/104 |
| 2009/0037927 A1* | 2/2009 | Sangili et al. | 718/108 |
| 2009/0070766 A1* | 3/2009 | Berman et al. | 718/104 |
| 2009/0172686 A1* | 7/2009 | Chen et al. | 718/103 |
| 2009/0217283 A1* | 8/2009 | Anand et al. | 718/104 |
| 2009/0249344 A1* | 10/2009 | Clissold et al. | 718/102 |
| 2009/0288086 A1* | 11/2009 | Ringseth et al. | 718/102 |
| 2009/0288087 A1* | 11/2009 | Ringseth et al. | 718/102 |

OTHER PUBLICATIONS

Kim, et al., "A Mainframe Grid Computing Infrastructure", Dated May 25, 2005, http://websphere.sys-con.com/read/47894.htm.

Regehr, "Design of the Hierarchical Scheduler Infrastructure", Chapter 4 of "Using Hierarchical Scheduling to Support Soft Real-Time Applications in General-Purpose Operating Systems", May 2001, http://www.cs.utah.edui~regehr/papers/diss/doc-wwwch4.html.

"HP OpenVMS Systems Documentation", http://h71000.www7.hp.com/doc/73final/6493/6101pro_031.html.

"Freenix presentation, Jun. 14, 2002, Monterey, California.", http://www.mit.edu/people/nathanw/usenix/talk/index.html.

PCT Search Report for Application No. PCT/US2009/042612 mailed on Nov. 30, 2009 (11 pages).

The First Office Action for Application No. 200980121207.1 mailed Oct. 9, 2012 (10 pages).

The International Preliminary Report on Patentability for International Application No. PCT/US2009/042612 mailed Dec. 16, 2010 (6 pages).

The Supplemental European Search Report for Application No. EP 09 758 902.2 mailed Sep. 4, 2012 (5 pages).

The Patent Examination Report No. 1 for Australian Patent Application No. 2009255464 issued Feb. 27, 2014 (3 pages).

\* cited by examiner

REGAINING CONTROL OF A PROCESSING RESOURCE THAT EXECUTES AN EXTERNAL EXECUTION CONTEXT

BACKGROUND

Processes executed in a computer system may include execution context schedulers that schedule tasks of processes for execution in the computer system. A scheduler may create execution contexts (e.g., threads, fibers, or child processes) in order to execute tasks. During execution, the scheduler maintains control over these execution contexts and maintains control of the processing resources allocated to the scheduler.

A scheduler typically does not have control over execution contexts created outside of the scheduler (i.e., external execution contexts). If a scheduler allows an external execution context to execute with a processing resource of the scheduler, then external execution context gains control of the processing resource. The external execution context may not include a mechanism for returning control of the processing resource to the scheduler. As a result, the scheduler may lose the processing resource that executes the external execution context.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A scheduler in a process of a computer system allows an external execution context to execute on a processing resource allocated to the scheduler. The scheduler provides control of the processing resource to the external execution context. The scheduler registers for a notification of an exit event associated with the external execution context. In response to receiving the notification that the exit event has occurred, the scheduler regains control of the processing resource and causes a task associated with an execution context controlled by the scheduler to be executed by the processing resource.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown, by way of illustration, specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

FIGS. 1A-1D are block diagrams illustrating embodiments of a scheduler 22 in a process 12 of a runtime environment 10. Scheduler 22 is configured to request and receive exit event notifications associated with an external execution context 26.

Figure 1A:
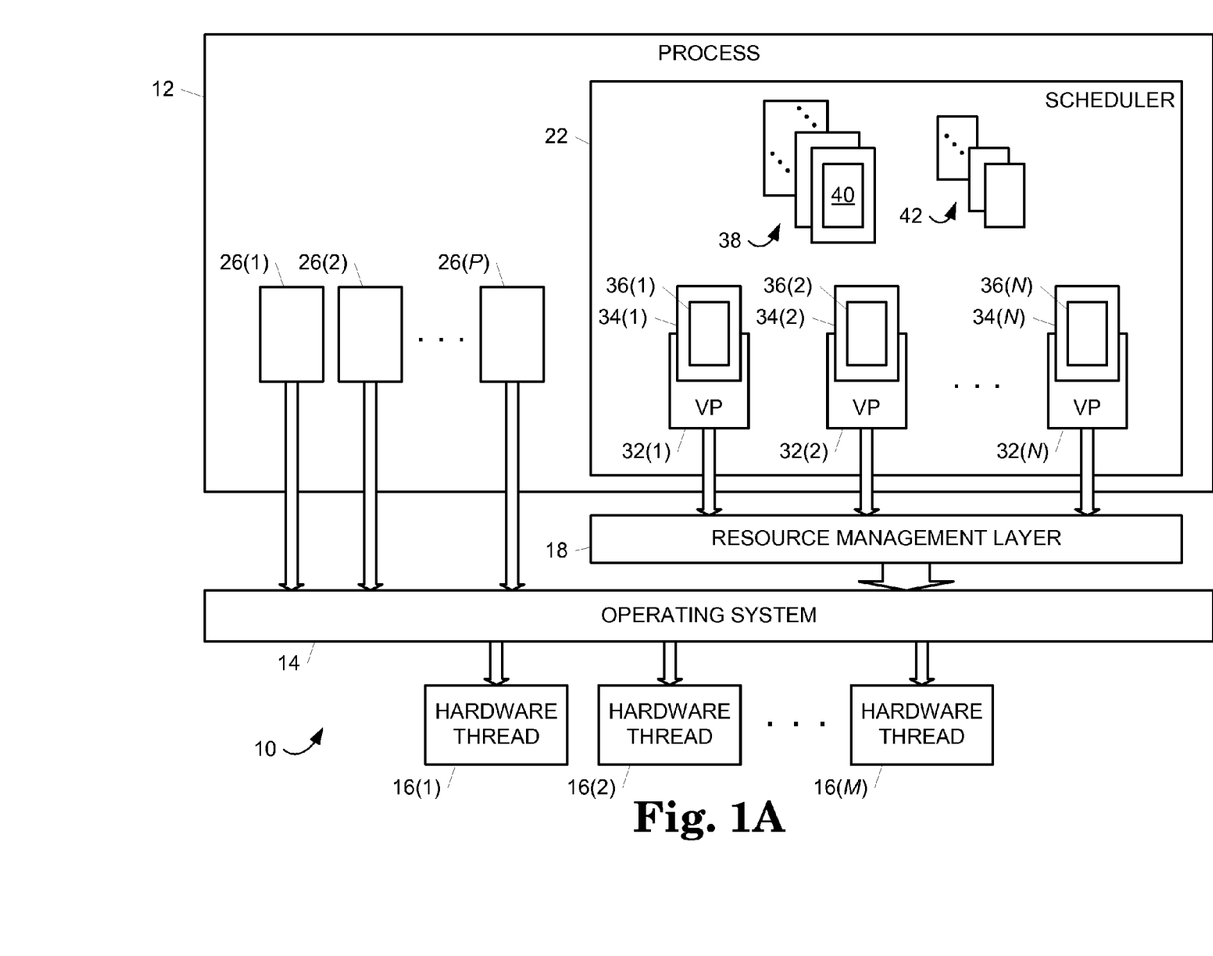
FIGS. 1A-1D are block diagrams illustrating embodiments of a scheduler configured to request and receive exit event notifications associated with an external execution context in a runtime environment.

Referring to FIG. 1A, runtime environment 10 represents a runtime mode of operation in a computer system, such as a computer system 100 shown in FIG. 5 and described in additional detail below, where the computer system is executing instructions. The computer system generates runtime environment 10 from a runtime platform such as a runtime platform 122 shown in FIG. 5 and described in additional detail below.

Runtime environment 10 includes an least one invoked process 12, an operating system (OS) 14, a set of hardware threads 16(1)-16(M), where M is an integer that is greater than or equal to one and denotes the Mth hardware thread 16(M), and a resource management layer 18. Runtime environment 10 allows tasks from process 12 to be executed, along with tasks from any other processes that co-exist with process 12 (not shown), using OS 14, resource management layer 18, and hardware threads 16(1)-16(M). Runtime environment 10 operates in conjunction with OS 14 and/or resource management layer 18 to allow process 12 to obtain processor and other resources of the computer system (e.g., hardware threads 16(1)-16(M)).

Runtime environment 10 includes a scheduler function that generates scheduler 22. In one embodiment, the scheduler function is implemented as a scheduler application programming interface (API). In other embodiments, the scheduler function may be implemented using other suitable programming constructs. When invoked, the scheduler function creates scheduler 22 in process 12 where scheduler 22 operates to schedule tasks of process 12 for execution by one or more hardware threads 16(1)-16(M). Runtime environment 10 may exploit fine grained concurrency that application or library developers express in their programs (e.g., process 12) using accompanying tools that are aware of the facilities that the scheduler function provides.

Process 12 includes an allocation of processing and other resources that hosts one or more execution contexts (viz., threads). Process 12 obtains access to the processing and other resources in the computer system (e.g., hardware threads 16(1)-16(M)) from OS 14 and/or resource management layer 18. Process 12 causes tasks to be executed using the processing and other resources.

Process 12 generates work in tasks of variable length where each task is associated with an execution context in scheduler 22. Each task includes a sequence of instructions that perform a unit of work when executed by the computer system. Each execution context forms a thread that executes associated tasks on allocated processing resources. Each execution context includes program state and machine state information. Execution contexts may terminate when there are no more tasks left to execute. For each task, runtime environment 10 and/or process 12 either assign the task to scheduler 22 to be scheduled for execution or otherwise cause the task to be executed without using scheduler 22.

Process 12 may be configured to operate in a computer system based on any suitable execution model, such as a stack model or an interpreter model, and may represent any suitable type of code, such as an application, a library function, or an operating system service. Process 12 has a program state and machine state associated with a set of allocated resources that include a defined memory address space. Process 12 executes autonomously or substantially autonomously from any co-existing processes in runtime environment 10. Accordingly, process 12 does not adversely alter the program state of co-existing processes or the machine state of any resources allocated to co-existing processes. Similarly, co-existing processes do not adversely alter the program state of process 12 or the machine state of any resources allocated to process 12.

OS 14 manages processing and other resources of the computer system and provides a set of functions that allow process 12 and other processes in the computer system to access and use the components. In addition, OS 14 offers execution contexts to scheduler 22 and process 12 in the computer system. As shown in FIG. 1A, OS 14 offers execution contexts 34(1)-34(N) and a set of execution contexts 38 to scheduler 22, where N is an integer greater than or equal to one and denotes the Nth execution context 34(N). OS 14 also offers execution contexts 26(1)-26(P) to process 12, where P is an integer greater than or equal to one and denotes the Pth execution context 26(P).

Hardware threads 16 reside in execution cores of a set or one or more processor packages (e.g., processor packages 102 shown in FIG. 5 and described in additional detail below) of the computer system. Each hardware threads 16 is configured to execute instructions independently or substantially independently from the other execution cores and includes a machine state. Hardware threads 16 may be included in a single processor package or may be distributed across multiple processor packages. Each execution core in a processor package may include one or more hardware threads 16.

Resource management layer 18 allocates processing resources to process 12 by assigning one or more hardware threads 16 to process 12. Resource management layer 18 exists separately from OS 14 in the embodiments of FIGS. 1A-1D. In other embodiments, resource management layer 18 or some or all of the functions thereof may be included in OS 14.

Process 12 implicitly or explicitly causes scheduler 22 to be created via the scheduler function provided by runtime environment 10. Scheduler instance 22 may be implicitly created when process 12 uses APIs available in the computer system or programming language features. In response to the API or programming language features, runtime environment 10 creates scheduler 22 with a default policy. To explicitly create a scheduler 22, process 12 may invoke the scheduler function provided by runtime environment 10 and specify one or more policies for scheduler 22.

Scheduler 22 interacts with resource management layer 18 to negotiate processing and other resources of the computer system in a manner that is transparent to process 12. Resource management layer 18 allocates hardware threads 16 to scheduler 22 based on supply and demand and any policies of scheduler 22.

In the embodiment shown in FIGS. 1A-1D, scheduler 22 manages the processing resources by creating virtual processors 32 that form an abstraction of underlying hardware threads 16. Scheduler 22 includes a set of virtual processors 32(1)-32(N) where N is an integer greater than or equal to one and denotes the Nth virtual processor 32(N). Scheduler 22 multiplexes virtual processors 32 onto hardware threads 16 by mapping each virtual processor 32 to a hardware thread 16. Scheduler 22 may map more than one virtual processor 32 onto a particular hardware thread 16 but maps only one hardware thread 16 to each virtual processor 32. In other embodiments, scheduler 22 manages processing resources in other suitable ways to cause instructions of process 12 to be executed by hardware threads 16.

The set of execution contexts in scheduler 22 includes a set of execution contexts 34(1)-34(N) with respective, associated tasks 36(1)-36(N) that are being executed by respective virtual processors 32(1)-32(N) and, at any point during the execution of process 12, a set of zero or more execution contexts 38. Each execution context 34 and 38 includes state information that indicates whether an execution context 34 or 38 is executing, runnable (e.g., in response to becoming unblocked or added to scheduler 22), or blocked. Execution contexts 34 that are executing have been attached to a virtual processor 32 and are currently executing. Execution contexts 38 that are runnable include an associated task 40 and are ready to be executed by an available virtual processor 32. Execution contexts 38 that are blocked also include an associated task 40 and are waiting for data, a message, or an event that is being generated by another execution context 34 or will be generated by another execution context 38.

Each execution context 34 executing on a virtual processor 32 may generate, in the course of its execution, additional tasks 42, which are organized in any suitable way (e.g., added to work queues (not shown in FIGS. 1A-1D)). Work may be created by using either application programming interfaces (APIs) provided by runtime environment 10 or programming language features and corresponding tools in one embodiment. When processing resources are available to scheduler 22, tasks are assigned to execution contexts 34 or 38 that execute them to completion on virtual processors 32 before picking up new tasks. An execution context 34 executing on a virtual processor 32 may also unblock other execution contexts 38 by generating data, a message, or an event that will be used by other execution contexts 38.

Figure 2:
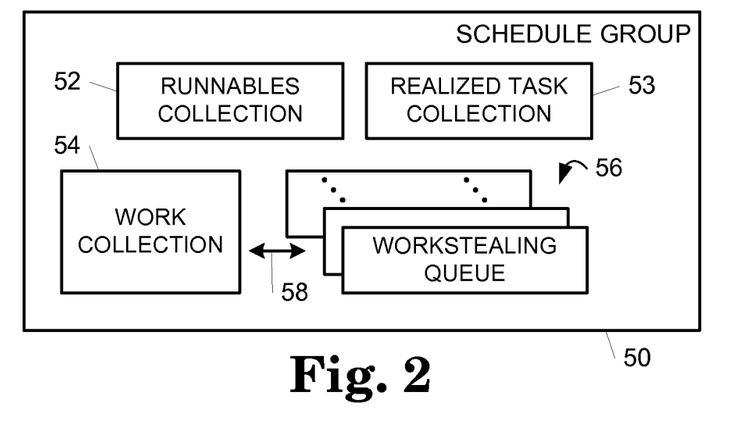
FIG. 2 is a block diagram illustrating an embodiment of a scheduling group for use in a scheduler.

Each task in scheduler 22 may be realized (e.g., realized tasks 36 and 40), which indicates that an execution context 34 or 38 has been or will be attached to the task and the task is ready to execute. Realized tasks typically include unblocked execution contexts and scheduled agents. A task that is not realized is termed unrealized. Unrealized tasks (e.g., tasks 42) may be created as child tasks generated by the execution of parent tasks and may be generated by parallel constructs (e.g., parallel, parallel for, begin, and finish). Scheduler 22 may be organized into a synchronized collection (e.g., a stack and/or a queue) for logically independent tasks with execution contexts (i.e., realized tasks) along with a list of workstealing queues for dependent tasks (i.e., unrealized tasks) as illustrated in the embodiment of FIG. 2 described below.

Upon completion, blocking, or other interruption (e.g., explicit yielding or forced preemption) of an execution context 34 running on a virtual processor 32, the virtual processor 32 becomes available to execute another realized task 40 or unrealized task 42. Scheduler 22 searches for a runnable execution context 38 or an unrealized task 42 to attach to the available virtual processor 32 for execution in any suitable way. For example, scheduler 22 may first search for a runnable execution context 38 to execute before searching for an unrealized task 42 to execute. Scheduler 22 continues attaching execution contexts 38 to available virtual processors 32 for execution until all tasks and execution contexts 38 of scheduler 22 have been executed.

In one embodiment, process 12 organizes tasks into one or more schedule groups 50 and presents schedule groups 50 to scheduler 22. FIG. 2 is a block diagram illustrating an embodiment of a schedule group 50 for use in scheduler 22.

Schedule group 50 includes a runnables collection 52, a realized task collection 53, a work collection 54, and a set of zero or more workstealing queues 56. Runnables collection 52 contains a list of unblocked execution contexts 38. Scheduler 22 adds an execution context 38 to runnables collection 52 when an execution context becomes unblocked. Realized task collection 53 contains a list of realized tasks 40 (e.g., unstarted agents) that may or may not have associated execution contexts 38. Scheduler 22 adds a realized task to realized task collection 53 or when a new runnable task is presented to scheduler 22 by process 12. Work collection 54 contains a list of workstealing queues 56 as indicated by an arrow 58 and tracks the execution contexts 34 that are executing tasks from the workstealing queues 56. Each workstealing queue 56 includes one or more unrealized tasks 42.

Using the embodiment of FIG. 2, scheduler 22 may first search for unblocked execution contexts 38 in the runnables collection 52 of each schedule group 50 in scheduler 22. Scheduler 22 may then search for realized tasks in the realized task collection 53 of all schedule groups 50 in scheduler 22 before searching for unrealized tasks in the workstealing queues 56 of the schedule groups 50.

In one embodiment, a virtual processor 32 that becomes available may attempt to locate a runnable execution context 38 in the runnables collection 52 in the schedule group 50 from which the available virtual processor 32 most recently obtained a runnable execution context 38 (i.e., the current schedule group 50). The available virtual processor 32 may then attempt to locate a runnable execution context 38 in the runnables collections 52 in the remaining schedule groups 50 of scheduler 22 in a round-robin or other suitable order. If no runnable execution context 38 is found, then the available virtual processor 32 may then attempt to locate an unrealized task 42 in the workstealing queues 56 of the current schedule group 50 before searching the workstealing queues 56 in the remaining schedule groups 50 of scheduler 22 in a round-robin or other suitable order.

Referring back to FIG. 1A, scheduler 22 creates and manages execution contexts 34 and 38. When an execution context 34 is executed to completion on a virtual processor 32, the execution context 34 returns control of the virtual processor 32 to scheduler 22. Scheduler 22 may then cause the virtual processor 32 to search for another execution context 38 to execute until all execution contexts 38 and tasks 42 have been executed to completion.

In addition to executions contexts 34 and 38 created and managed by scheduler 22, scheduler 22 allows external execution contexts 26 created by process 12 and external to scheduler 22 to directly execute on virtual processors 32 belonging to scheduler 22. When external execution contexts 26 directly execute on virtual processors 32 belonging to scheduler 22, scheduler 22 turns control of the virtual processors 32 over to external execution contexts 26. By doing so, scheduler 22 may avoid potentially expensive context switching and allow scheduling policies of scheduler 22 to be applied to the external execution contexts 26.

Because external execution contexts 26 are not under the control of scheduler 22, however, external execution contexts 26 do not return virtual processors 32 to scheduler 22. Instead, external execution contexts 26 continue using virtual processors 32 until external execution contexts 26 stop execution by exiting runtime environment 10 or the operating system environment created by operating system 14. When external execution contexts 26 stop execution, scheduler 22 reclaims virtual processors 32 used by external execution contexts 26.

In order to reclaim virtual processors 32 used by external execution contexts 26, scheduler 22 registers for notifications of exit events associated with external execution contexts 26 with runtime environment 10 or OS 14. In response to receiving notifications that exit events have occurred from runtime environment 10 or OS 14, scheduler 22 regains control of the virtual processors 32 and causes tasks 40 or 42 associated with execution contexts 34 or 38 controlled by scheduler 22 to be executed by the virtual processors 32.

Figure 3:
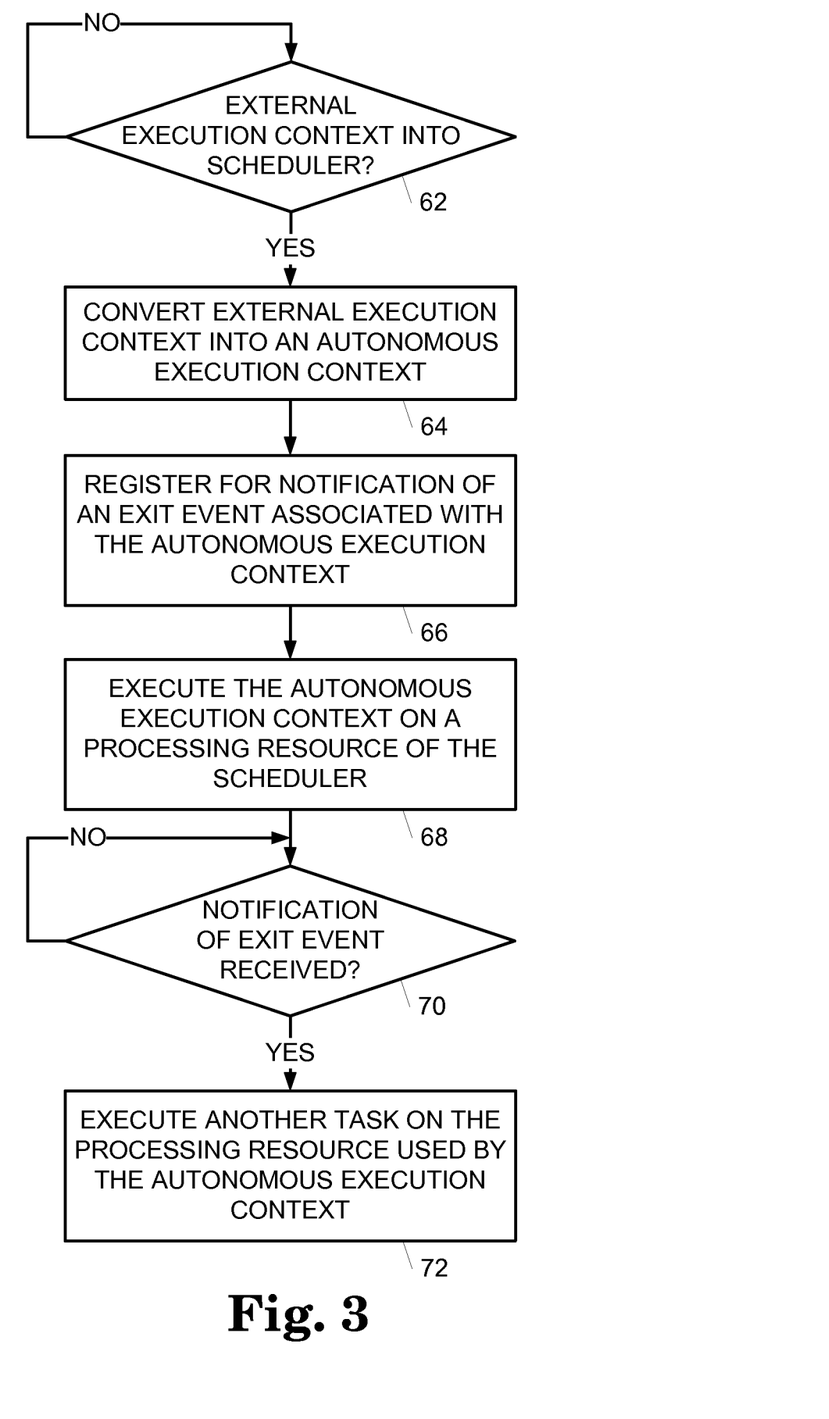
FIG. 3 is a flow chart illustrating an embodiment of a method for requesting and receiving exit event notifications associated with an external execution context.
Figure 4:
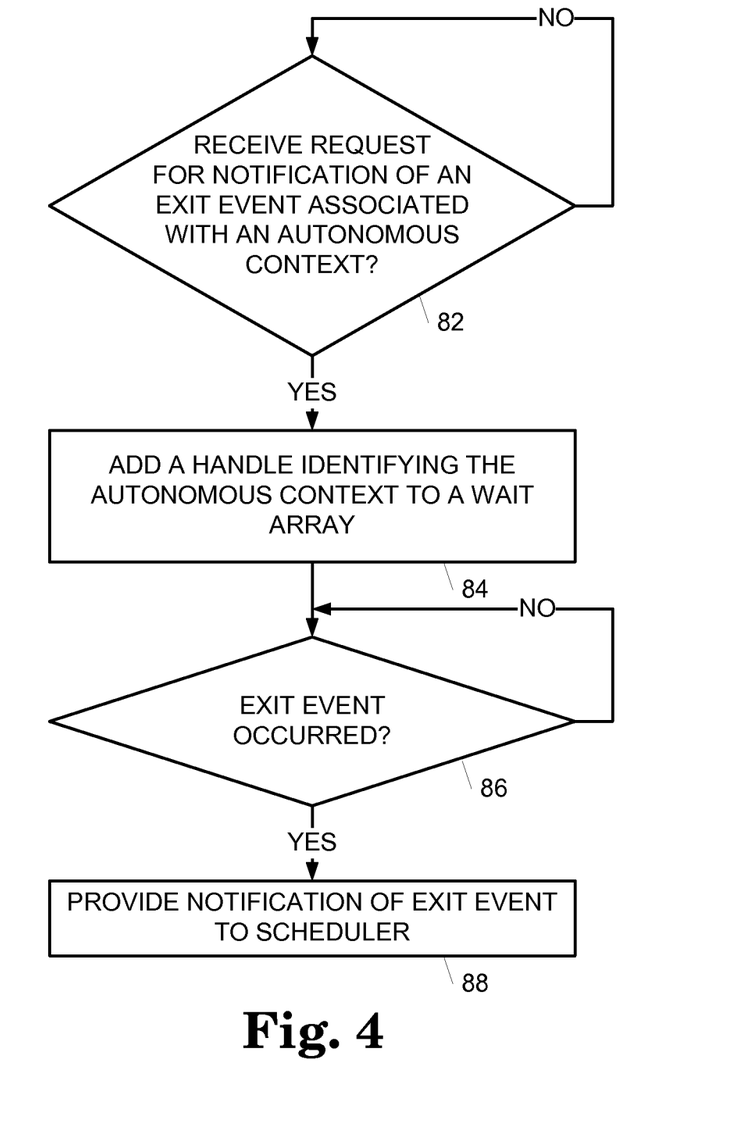
FIG. 4 is a flow chart illustrating an embodiment of a method for providing exit event notifications.

FIG. 3 is a flow chart illustrating an embodiment of a method for requesting and receiving exit event notifications associated with an external execution context 26. The method of FIG. 3, as performed by scheduler 22, will be described with reference to the embodiments of FIGS. 1A-1D. In addition, the functions performed by runtime environment 10 or OS 14 will be described with reference to FIG. 4. FIG. 4 is a flow chart illustrating an embodiment of a method for providing exit event notifications.

In FIG. 3, scheduler 22 determines whether an external execution context is being included in scheduler 22 as indicated in a block 62. As used herein, the term external execution context refers to an execution context created by process 12 and not scheduler 22. Process 12, therefore, controls the execution of external execution contexts. An external execution context may be included in scheduler 22 in response to generating tasks for execution by scheduler 22 or by explicitly creating scheduler 22.

With reference to the example of FIG. 1A, scheduler 22 determines whether any of external execution contexts 26 are being included in scheduler 22. Process 12 creates external execution contexts 26 by providing a request to OS 14. Because these external execution contexts 26 were created by process 12, process 12, rather than scheduler 22, controls the execution of external execution contexts 26. In contrast, scheduler 22 creates execution contexts 34 and 38 by providing a request to OS 14. Accordingly, scheduler 22 controls the execution of execution contexts 34 and 38.

If an external execution context is being included in scheduler 22, then scheduler 22 converts the external execution context into an autonomous execution context as indicated in a block 64. As used herein, an autonomous execution context is an execution context that executes on a processing resource of scheduler 22 but is not under the control of scheduler 22. Accordingly, scheduler 22 provides a processing resource of scheduler 22 for use by an autonomous execution context to allow the autonomous execution context to execute on the processing resource. By doing so, scheduler 22 relinquishes control of the processing resource such that the processing resource is under control of the autonomous execution context and not under control of scheduler 22.

Figure 1B:
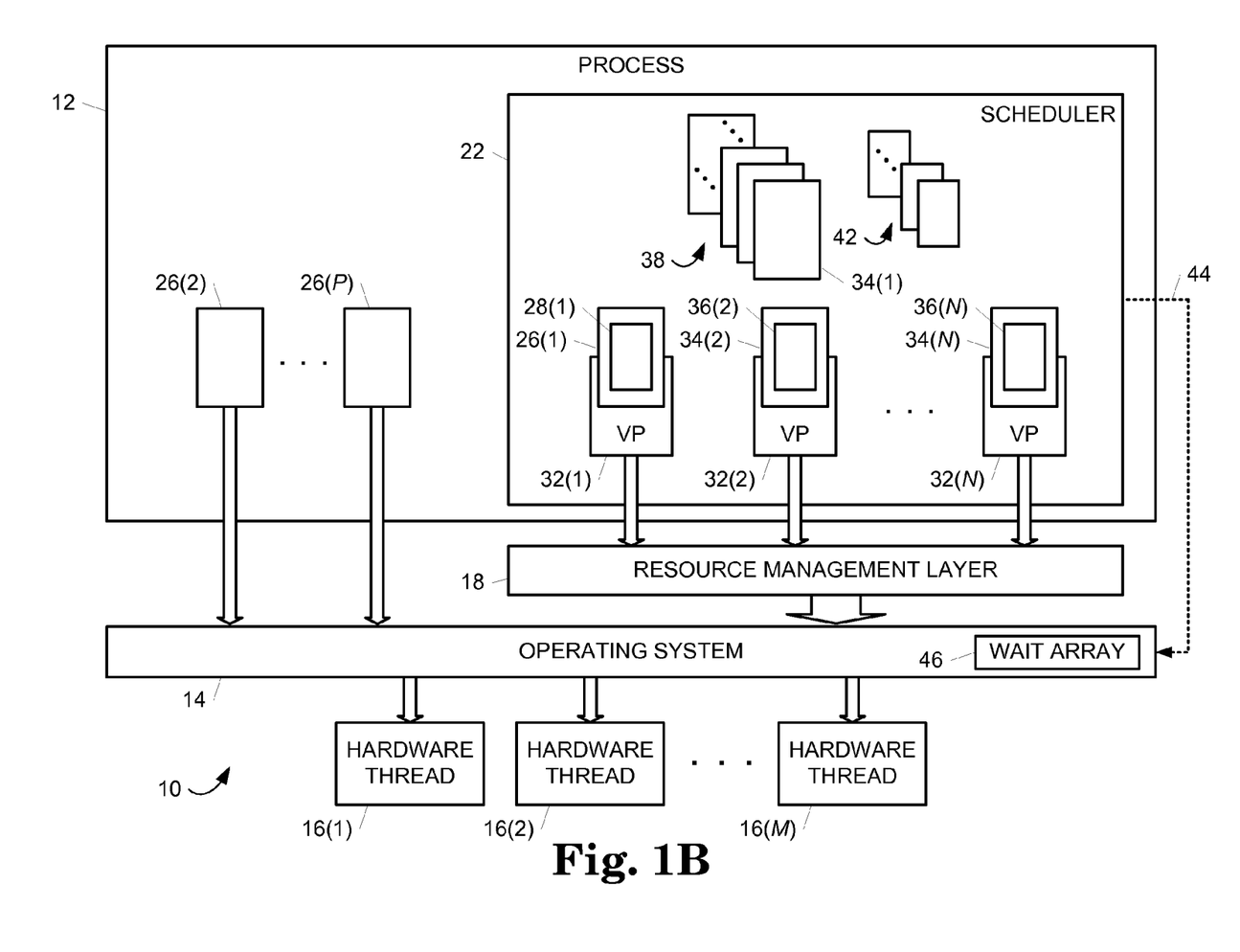

With reference to the example of FIG. 1B, scheduler 22 determines that external execution context 26(1) is being included in scheduler 22. Scheduler 22 converts external execution context 26(1) into an autonomous execution context 26(1) and provides virtual processor 32(1) to autonomous execution context 26(1). Virtual processor 32(1) executes at least one task 28(1) of autonomous execution context 26(1).

Scheduler 22 registers for a notification of an exit event associated with the autonomous execution context as indicated in a block 66. The autonomous execution context executes tasks of process 12 in scheduler 22 and may not include a mechanism for returning control of the processing resource to scheduler 22. The autonomous execution context continues to execute on the processing resource of scheduler 22 unless the autonomous execution context explicitly detaches from scheduler 22 (e.g., via an API provided by runtime environment 10). The autonomous execution context may exit runtime environment 10 and/or the operating system environment created by OS 14 at any time. Accordingly, scheduler 22 provides a signal to runtime environment 10 or OS 14 to register for a notification of an exit event associated with the autonomous execution context. For example, scheduler 22 provides a signal 44 to OS 14 as shown in FIG. 1B. Where OS 14 is a Windows Operating System, scheduler 22 may cause a handle of the autonomous execution context to be added a wait array 46 and wait for a signal from OS 14. In other embodiments, scheduler 22 may cause the handle to be provided to or stored in other suitable data structures.

Referring to FIG. 4, a determination is made by runtime environment 10 or OS 14 as to whether a request for notification of an exit event associated with an autonomous execution context has been received as indicated in a block 82. Runtime environment 10 or OS 14 receives a request from scheduler 22 for a notification of an exit event associated with an autonomous execution context executing on a processing resource allocated to scheduler 22. For example, OS 14 receives signal 44 from scheduler 22 in the example of FIG. 1B. In response to receiving the request, runtime environment 10 or OS 14 adds a handle identifying the autonomous execution context to wait array 46 as indicated in a block 84. In other embodiments, runtime environment 10 or OS 14 may store the notification request in other suitable data structures.

Referring back to FIG. 3, the autonomous execution context executes on a processing resource of scheduler 22 as indicated in a block 68. In the example of FIG. 1B, autonomous execution context 26(1) executes on virtual processor 32(1) of scheduler 22. Prior to autonomous execution context 26(1) executing, virtual processor 32(1) executes execution context 34(1) as shown in FIG. 1A. Virtual processor 32(1) may become available to execute autonomous execution context 26(1) in response to completion, blocking, or other interruption (e.g., explicit yielding or forced preemption) of execution context 34(1). Other virtual processors 32 in scheduler 22 may continue executing execution contexts 34 of scheduler 22 while virtual processor 32(1) executes autonomous execution context 26(1). The autonomous execution context may cease executing on virtual processor 32(1) and exit runtime environment 10 and/or the operating system environment created by OS 14 at any time.

Figure 1C:
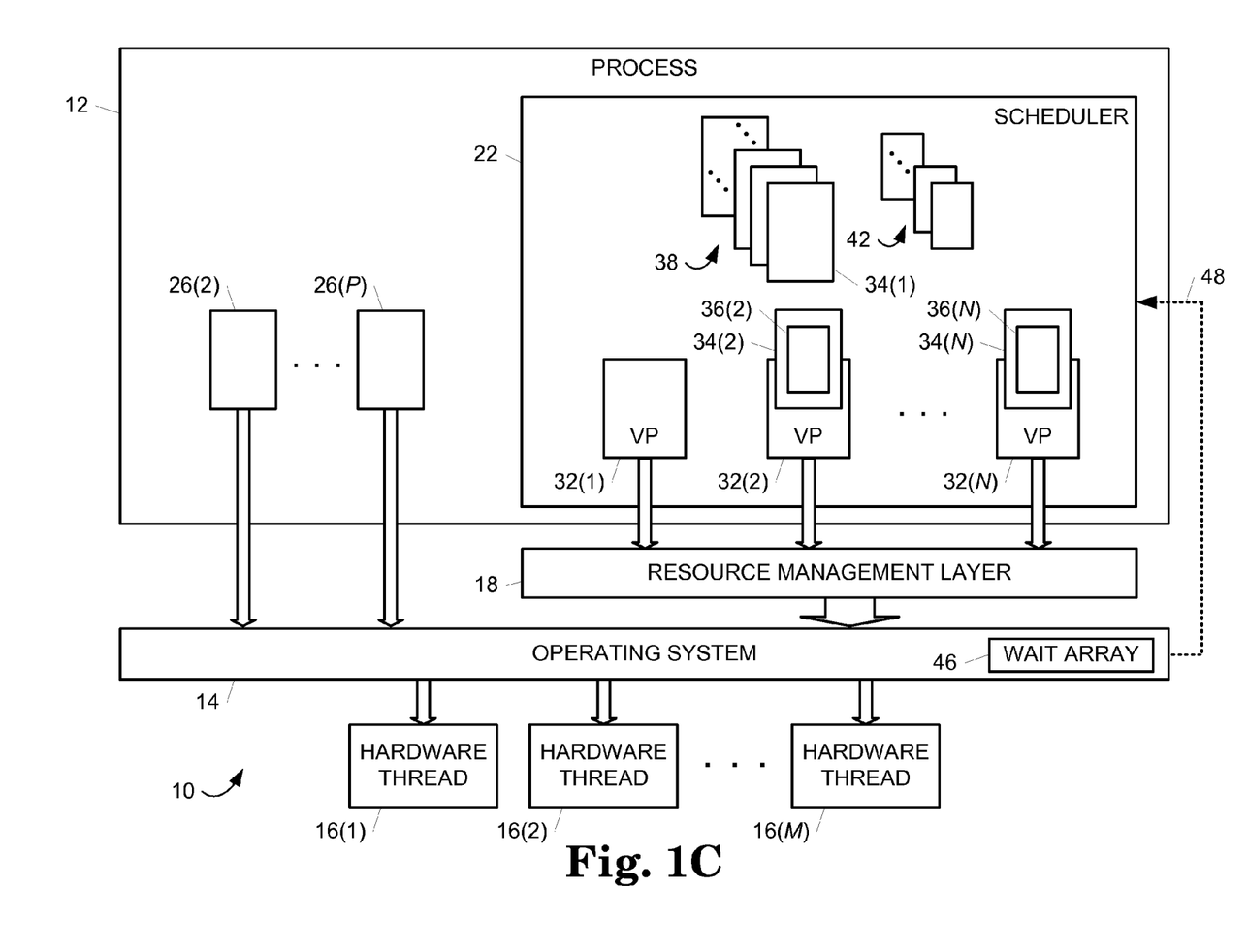

Referring back to FIG. 4, a determination is made by runtime environment 10 or OS 14 as to whether an exit event associated with the autonomous execution context has occurred as indicated in a block 86. Runtime environment 10 or OS 14 detect the exit event when the autonomous execution context exits or otherwise terminates and stops executing on the processing resource of scheduler 22. As shown in the example of FIG. 1C, virtual processor 32(1) is no longer executing autonomous execution context 26(1). In response to determining that an exit event has occurred, runtime environment 10 or OS 14 provides a notification of the exit event to scheduler 22 as indicated in a block 88. For example, OS 14 provides signal 48 to scheduler 22 in the example of FIG. 1C.

Referring back to FIG. 3, scheduler 22 determines whether the notification of the exit event corresponding to the autonomous execution context has been received as indicated in a block 70. In response to receiving the notification of the exit event (e.g., receiving signal 48 from OS 14), scheduler 22 identifies and regains control of the processing resource that executed the autonomous execution context. Scheduler 22 executes another task on the processing resource used by the autonomous context as indicated in a block 72.

Figure 1D:
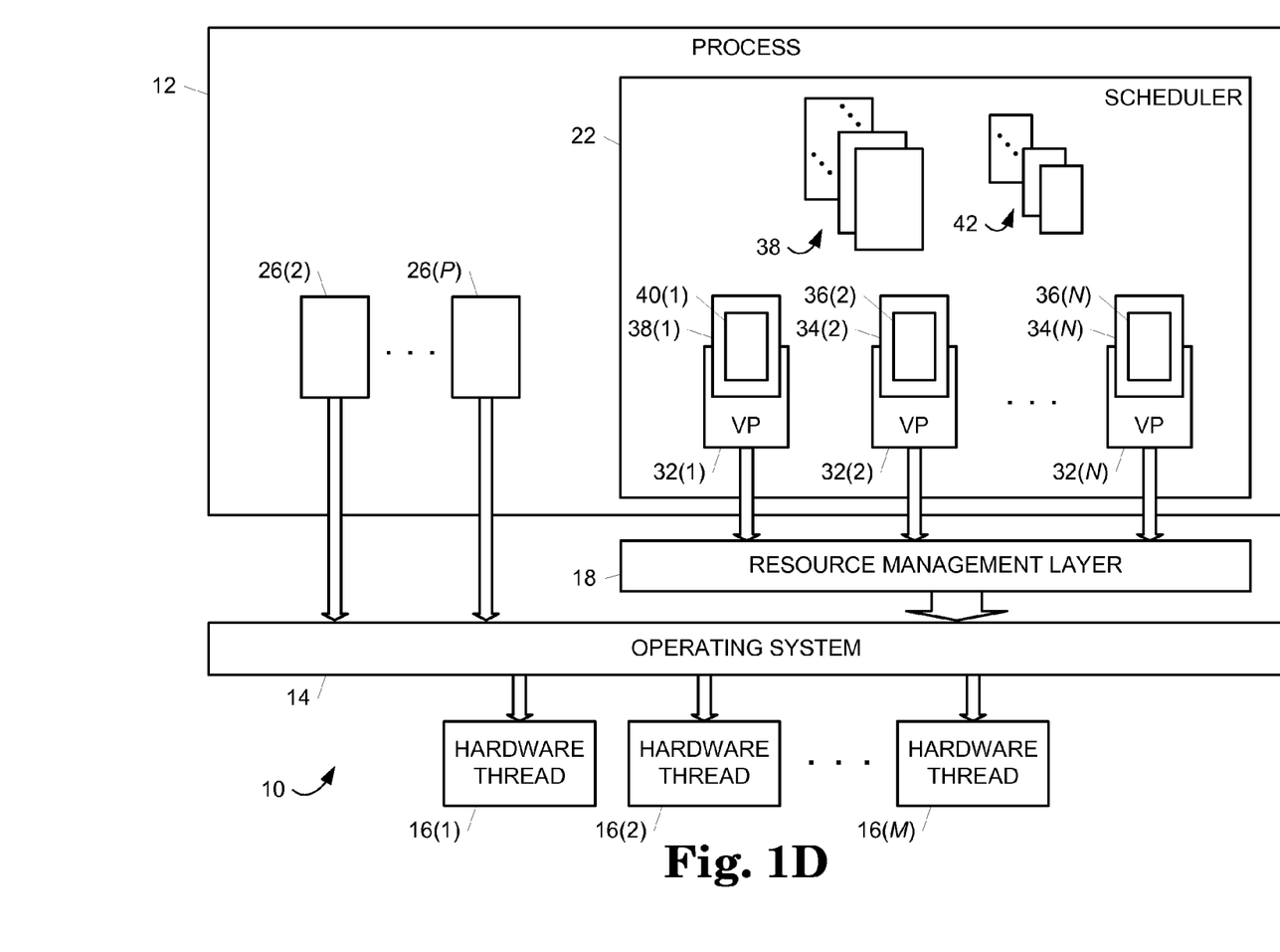

In the example of FIG. 1D, scheduler 22 regains control of virtual processor 32(1) and causes a task 40(1) associated with an execution context 38(1) to be executed on virtual processor 32(1) subsequent to regaining control of virtual processor 32(1). Execution context 38(1) may be an unblocked or new execution context.

Using the methods of FIGS. 3 and 4, scheduler 22 allows external execution contexts to be executed with processing resources of scheduler 22 while ensuring that the processing resources are reclaimed by scheduler 22 subsequent to the external execution contexts exiting.

Figure 5:
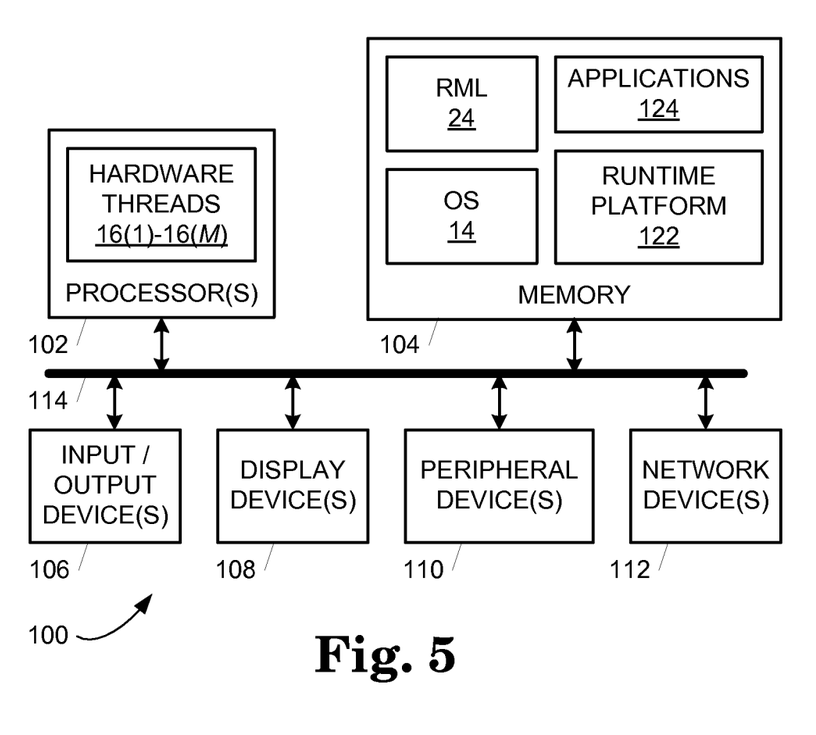
FIG. 5 is a block diagram illustrating an embodiment of a computer system configured to implement a runtime environment including a scheduler configured to request and receive exit event notifications associated with an external execution context.

FIG. 5 is a block diagram illustrating an embodiment of computer system 100 which is configured to implement runtime environment 10 including scheduler 22 where scheduler 22 is configured to request and receive exit event notifications associated with an external execution context.

Computer system 100 includes one or more processor packages 102, a memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 include hardware threads 16(1)-16(M). Each hardware thread 16 in processor packages 102 is configured to access and execute instructions stored in memory system 104. The instructions may include a basic input output system (BIOS) or firmware (not shown), OS 14 (also shown in FIGS. 1A-1D), a runtime platform 122, applications 124, and resource management layer 18 (also shown in FIGS. 1A-1D). Each hardware thread 16 may execute the instructions in conjunction with or in response to information received from input/output devices 106, display devices 108, peripheral devices 110, and/or network devices 112.

Computer system 100 boots and executes OS 14. OS 14 includes instructions executable by hardware threads 16 to manage the components of computer system 100 and provide a set of functions that allow applications 124 to access and use the components. In one embodiment, OS 14 is the Windows operating system. In other embodiments, OS 14 is another operating system suitable for use with computer system 100.

Resource management layer 18 includes instructions that are executable in conjunction with OS 14 to allocate resources of computer system 100 including hardware threads 16 as described above with reference to FIGS. 1A-1D. Resource management layer 18 may be included in computer system 100 as a library of functions available to one or more applications 124 or as an integrated part of OS 14.

Runtime platform 122 includes instructions that are executable in conjunction with OS 14 and resource management layer 18 to generate runtime environment 10 and provide runtime functions to applications 124. These runtime functions include a scheduler function as described in additional detail above with reference to FIGS. 1A-1D. The runtime functions may be included in computer system 100 as part of an application 124, as a library of functions available to one or more applications 124, or as an integrated part of OS 14 and/or resource management layer 18.

Each application 124 includes instructions that are executable in conjunction with OS 14, resource management layer 18, and/or runtime platform 122 to cause desired operations to be performed by computer system 100. Each application 124 represents one or more processes, such as process 12 as described above, that may execute with scheduler 22 as provided by runtime platform 122.

Memory system 104 includes any suitable type, number, and configuration of volatile or non-volatile storage devices configured to store instructions and data. The storage devices of memory system 104 represent computer readable storage media that store computer-executable instructions including OS 14, resource management layer 18, runtime platform 122, and applications 124. The instructions are executable by computer system to perform the functions and methods of OS 14, resource management layer 18, runtime platform 122, and applications 124 described herein. Examples of storage devices in memory system 104 include hard disk drives, random access memory (RAM), read only memory (ROM), flash memory drives and cards, and magnetic and optical disks.

Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

The above embodiments allow a task scheduler to use external execution contexts (i.e., contexts that are outside of the control of the scheduler) in order to schedule work without depleting virtualized processing resources when the external execution contexts terminate. By doing so, a potentially expensive context switching may be avoided and desired scheduling policies of scheduler 22 may be applied to selected external execution contexts.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a scheduler of a process executing on a computer system, the method comprising:
providing a first processing resource of the scheduler for use by a first execution context such that the first processing resource is not under control of the scheduler, the first execution context is external to the scheduler and is created and controlled by the process;
registering for a notification of an exit event associated with the first external context; and
regaining control of the first processing resource in response to receiving the notification of the exit event.

2. The method of claim 1 further comprising:
executing the first execution context with the first processing resource.

3. The method of claim 1 further comprising:
executing a task of the scheduler on the first processing resource subsequent to regaining control of the first processing resource.

4. The method of claim 3 further comprising:
associating the task with a second execution context prior to executing the task.

5. The method of claim 4 wherein the scheduler created the second execution context.

6. The method of claim 1 further comprising:
executing a task of the scheduler on the first processing resource prior to providing the first processing resource for use by the first execution context.

7. The method of claim 1 further comprising:
registering for the notification of the exit event associated with the first execution context with one of an operating system or a runtime environment.

8. The method of claim 1 further comprising:
executing a task of the scheduler on a second processing resource of the scheduler subsequent to providing the first processing resource for use by the first execution context and prior to regaining control of the first processing resource.

9. The method of claim 1 wherein the first processing resource includes a virtual processor and a hardware thread.

10. A system comprising:
   processor packages and memory configured to:
   execute a scheduler in a process to provide a processing resource allocated to the scheduler for use by an autonomous execution context external to the scheduler, the autonomous execution context is created and controlled by the process;
   execute a runtime environment;
   execute an operating system;
   one of the execution of the runtime environment and the execution of the operating system to:
   receive a request for a notification of an exit event associated with the autonomous execution context executing on the processing resource allocated to the scheduler in the process; and
   provide the notification of the exit event to the scheduler in response to detecting that the exit event has occurred.

11. The system of claim 10, one of the execution of the runtime environment and the execution of the operating system to:
   add a handle identifying the autonomous execution context to a wait array.

12. The system of claim 10, one of the execution of the runtime environment and the execution of the operating system to:
   detect that the exit event has occurred by detecting that the autonomous execution context has exited.

13. The system of claim 10 wherein the autonomous execution context controls the processing resource of the scheduler.

14. A computer readable hardware storage device storing computer-executable instructions that, when executed by a computer system, perform a method comprising:
   executing a first execution context on a processing resource provided from a scheduler of a process to the first execution context such that the processing resource is not under control of the scheduler, the first execution context is external to the scheduler and is created and controlled by the process;
   registering for a notification of an exit event associated with the first execution context provided to the scheduler in the process executing on the computer system; and
   executing a first task on the processing resource subsequent to receiving the notification of the exit event.

15. The computer readable hardware storage device of claim 14, the method further comprising:
   creating the first execution context with the process prior to providing the first execution context to the scheduler.

16. The computer readable hardware storage device of claim 14, the method further comprising:
   creating a second execution context with the scheduler; and
   associating the first task with the second execution context prior to executing the task.

17. The computer readable hardware storage device of claim 14, the method further comprising:
   converting the first execution context in the process to an autonomous execution context that includes the first execution context that gains control of the processing resource.

18. The computer readable hardware storage device of claim 14, the method further comprising:
   registering for the notification of the exit event with one of an operating system or a runtime environment.

19. The computer readable hardware storage device of claim 14, the method further comprising:
   executing a second task of the scheduler on a second processing resource of the scheduler while executing the first execution context on the first processing resource.

20. The computer readable hardware storage device of claim 14 wherein the first processing resource includes a virtual processor and a hardware thread.

* * * * *